(12) United States Patent
Baratam et al.

(10) Patent No.: US 9,178,832 B2
(45) Date of Patent: Nov. 3, 2015

(54) QUEUE CREDIT MANAGEMENT (71) Applicant: International Business Machines Corporation, Armonk, NY (US)

(72) Inventors: Prakash B. Baratam, Bangalore (IN); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 115 days.

(21) Appl. No.: 13/940,056

(22) Filed: Jul. 11, 2013

(65) Prior Publication Data

US 2015/0016254 A1    Jan. 15, 2015

(51) Int. Cl.
*H04L 12/801* (2013.01)
*H04L 12/873* (2013.01)

(52) U.S. Cl.
CPC .............. *H04L 47/39* (2013.01); *H04L 47/527* (2013.01)

(58) Field of Classification Search
CPC ........ H04L 47/10; H04L 45/00; H04L 47/527
See application file for complete search history.

(56) References Cited

U.S. PATENT DOCUMENTS

| 6,618,354 | B1 | 9/2003 | Sharma | |
|---|---|---|---|---|
| 7,085,846 | B2 | 8/2006 | Jenne et al. | |
| 7,304,949 | B2 | 12/2007 | Gusat et al. | |
| 7,948,894 | B2 | 5/2011 | Beukema et al. | |
| 7,953,024 | B2 | 5/2011 | Mayhew et al. | |
| 8,274,971 | B2 | 9/2012 | Battle et al. | |
| 8,400,924 | B2 * | 3/2013 | Wang et al. | 370/235 |
| 2004/0223454 | A1 | 11/2004 | Schober et al. | |
| 2005/0018674 | A1 * | 1/2005 | Dropps et al. | 370/389 |
| 2006/0153078 | A1 * | 7/2006 | Yasui | 370/235 |
| 2007/0177498 | A1 | 8/2007 | Clark et al. | |

* cited by examiner

*Primary Examiner* — Jung Park
*Assistant Examiner* — Chuong M Nguyen
(74) *Attorney, Agent, or Firm* — Patterson & Sheridan, LLP (57) ABSTRACT

To prevent buffer overflow, a receiving entity may use credits to control the total amount of packets any single transmitting entity can forward. Once the assigned credits are spent, the transmitting entity cannot send data portions to the receiving entity until additional credits are provided. However, the logic in the receiving entity may be designed to manage a maximum number of credits that is less than the capacity of the buffer in the transmitting entity. For example, the receiving entity is designed to manage a maximum of eight credits but the buffer has room for twelve data portions. To use the buffer efficiently, the transmitting entity may identify when extra buffer storage is available and provide additional credits. In addition, the transmitting entity may control when the credits are provided such that the receiving entity is not allocated more credits that it was designed to manage.

11 Claims, 7 Drawing Sheets

| TIME | TOTAL CREDITS RECEIVED | NUMBER OF PACKETS TRANSMITTED | NUMBER OF CREDITS REMAINING | BUFFER LOCATION | NUMBER OF PACKETS STORED | ARBITRATION WINNER |
|---|---|---|---|---|---|---|
| 0 | 8 | 0 | 8 | 0000 0000 0000 | 0 | - |
| 1 | 8 | 1 | 7 | 0000 0000 0001 | 1 | - |
| 2 | 8 | 2 | 6 | 0000 0000 0011 | 2 | - |
| 3 | 8 | 3 | 5 | 0000 0000 0111 | 3 | - |
| 4 | 8 | 4 | 4 | 0000 0000 1111 | 4 | - |
| 5 | 8 | 5 | 3 | 0000 0001 1111 | 5 | - |
| 6 | 8 | 6 | 2 | 0000 0011 1111 | 6 | - |
| 7 | 8 | 7 | 1 | 0000 0111 1111 | 7 | - |
| 8 | 8 | 8 | 0 | 0000 1111 1111 | 8 | - |
| 9 | 9 | 9 | 1 | 0001 1111 1111 | 9 | - |
| 10 | 10 | 10 | 1 | 0011 1111 1111 | 10 | - |
| 11 | 11 | 11 | 1 | 0111 1111 1111 | 11 | - |
| 12 | 12 | 12 | 0 | 1111 1111 1111 | 12 | - |
| 13 | 13 | 12 | 1 | 1111 1111 1110 | 11 | LOCATION 0 |
| 14 | 14 | 12 | 2 | 1111 1110 1110 | 10 | LOCATION 4 |
| 15 | 15 | 12 | 3 | 1011 1111 1010 | 9 | LOCATION 10 |

QUEUE CREDIT MANAGEMENT

BACKGROUND

The present invention relates to issuing credits for transferring data packets in a distributed switch, and more specifically, to allocating credits when the capacity of a buffer exceeds the total number of credits a transmitting entity is designed to manage.

Computer systems often use multiple computers that are coupled together in a common chassis. The computers may be separate servers that are coupled by a common backbone within the chassis. Each server is a pluggable board that includes at least one processor, an on-board memory, and an Input/Output (I/O) interface. Further, the servers may be connected to a switch to expand the capabilities of the servers. For example, the switch may permit the servers to access additional Ethernet networks or PCIe slots, as well as permit communication between servers in the same or different chassis.

The switch may use credits to transmit data within the switch. Generally, the credits ensure that a transmitting entity does not transmit more data than can be stored by a receiving entity. As the receiving entity forwards received packets to their ultimate destinations, the receiving entity returns a credit to the transmitting entity which the transmitting entity may then use to send another packet to the receiving entity.

SUMMARY

One embodiment described herein includes a method and computer program product for transferring data packets between a first module and second module. The method and computer program product include providing a number of credits to a first module not in excess of a maximum number of credits the first module is designed to manage and the first module maintains a credit count that is decreased each time a data packet is transmitted from the first module to the second module. The method and computer program product include storing a plurality of received data packets in a memory buffer in the second module. The memory buffer having a defined storage capacity dedicated to storing data packets received only from the first module and the storage capacity exceeds the maximum number of credits the first module is designed to manage. Upon determining that the credit count of the first module is less than the maximum number of credits and that there is available space in the memory locations, provide an extra credit to the first module, the method and computer program product include providing an extra credit to the first module, thereby increasing the credit count.

Another embodiment described herein includes a first module, a second module comprising a memory buffer, and an interconnect coupling the first module to the memory buffer in the second module. The first module is designed to manage no more than a maximum number of credits and is configured to maintain a credit count that is decreased each time a data packet is transmitted by the first module. The second module is configured to provide a maximum number of credits to the first module and store a plurality of data packets received from the first module in the memory buffer. The memory buffer has a defined storage capacity dedicated to storing data packets received only from the first module and the storage capacity exceeds the maximum number of credits the first module is designed to manage. Upon determining that the credit count of the first module is less than the maximum number of credits and that there is available space in the memory locations, provide an extra credit to the first module, the second module is configured to provide an extra credit to the first module, thereby increasing the credit count.

BRIEF DESCRIPTION OF THE SEVERAL VIEWS OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

A distributed, virtual switch may appear as a single switch element to a computing system (e.g., a server) connected to the distributed switch. In reality, the distributed switch may include a plurality of different switch modules that are interconnected via a switching layer such that each of the switch modules may communicate with any other of the switch modules. For example, a computing system may be physically connected to a port of one switch module but, using the switching layer, is capable of communicating with a different switch module that has a port connected to a WAN (e.g., the Internet). Moreover, each of the switch modules may be configured to accept and route data based on two different communication protocols. To the computing system, however, the two separate switch modules appear as a single switch.

The distributed switch may include a plurality of chips (i.e., sub-switches) on each switch module. These sub-switches may receive a multicast data frame (e.g., an Ethernet frame) that designates a plurality of different destination sub-switches. The sub-switch that receives the data frame is responsible for creating copies of a portion of the frame, such as the frame's payload, and forwarding that portion to the respective destination sub-switches using the fabric of the distributed switch. To reach the destination sub-switches, the sub-switch may first route the data portions to a linking switch. This linking switch may include a connection to each of the various sub-switches in the distributed switch. Thus, instead of sending the data portion directly to the destination sub-switch, the receiving sub-switch transmits the data portion to the linking switch which then forwards the data to the destination sub-switch.

To facilitate data transfer, the linking switch may have a communication path to each of the sub-switches in the distributed switch. Each communication path may include a receiving link on which the linking switch receives data from the sub-switch and a transmitting link on which the linking switch transmits data to the sub-switch. In this manner, the linking switch can receive and forward data to the various sub-switches in the distributed switch. However, different data portions may have the same destination. That is, the linking switch may receive two data portions that have the same destination sub-switch. To decide which packet gets to use the transmitting link, the linking switch may employ an arbitration algorithm to select a winning packet. The data portion that is not selected by the arbitration algorithm remains buffered on the linking switch.

To ensure that the data portions sent by the sub-switches to the linking switch do not overflow its buffer capacity, the linking switch may use credits to control the total amount any single sub-switch can forward. Once the assigned credits are spent, the sub-switch cannot transmit data portions to the linking switch until the linking switch returns credits to the sub-switch. In one embodiment, the logic in the sub-switch may be designed to manage a maximum total number of credits but the buffer capacity of the linking switch may be able to store additional data portions—e.g., the software or hardware of the sub-switch is designed to manage a maximum of eight credits but the buffer has room for twelve data portions. To use the buffers efficiently, the linking switch may identify when extra buffer storage is available and provide additional credits to the sub-switch. Nonetheless, the linking switch may control when the credits are allocated such that the sub-switch does not have more credits that it was designed to manage (eight, in the above example). In this manner, linking switches with extra buffer space may be efficiently used with sub-switches designed to manage less credits than the total buffer space in the linking switch.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud being run or stored on the servers. For example, an application could execute on a server implementing the virtual switch in the cloud. Doing so allows a user to access this information from any computing system attached to a network connected to the cloud (e.g., the Internet).

Figure 1:
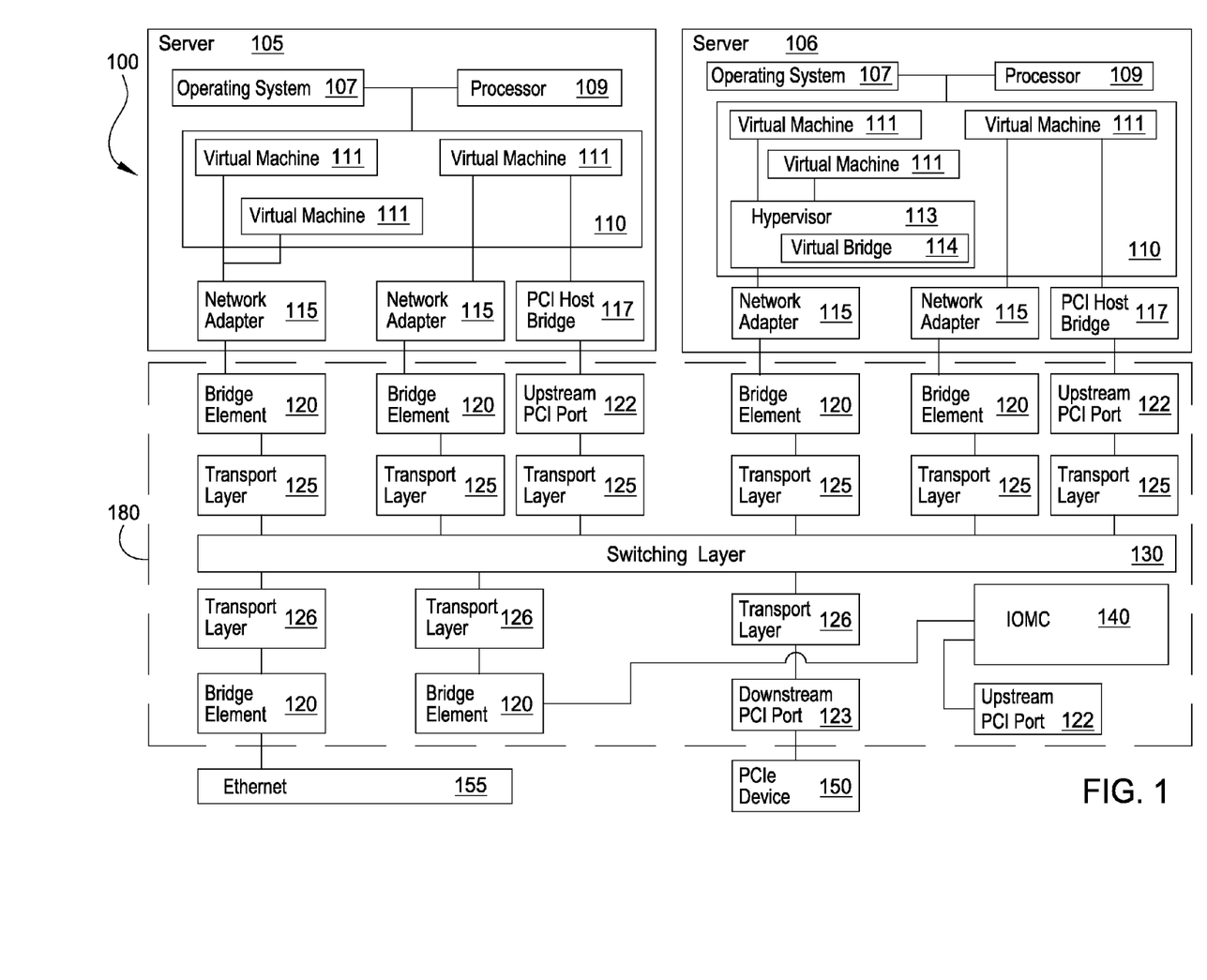
FIG. 1 illustrates a system architecture that includes a distributed, virtual switch, according to one embodiment described herein.

FIG. 1 illustrates a system architecture that includes a distributed virtual switch, according to one embodiment described herein. The first server 105 may include at least one processor 109 coupled to a memory 110. The processor 109 may represent one or more processors (e.g., microprocessors) or multi-core processors. The memory 110 may represent random access memory (RAM) devices comprising the main storage of the server 105, as well as supplemental levels of memory, e.g., cache memories, non-volatile or backup memories (e.g., programmable or flash memories), read-only memories, and the like. In addition, the memory 110 may be considered to include memory storage physically located in the server 105 or on another computing device coupled to the server 105.

The server 105 may operate under the control of an operating system 107 and may execute various computer software applications, components, programs, objects, modules, and data structures, such as virtual machines 111.

The server 105 may include network adapters 115 (e.g., converged network adapters). A converged network adapter may include single root I/O virtualization (SR-IOV) adapters such as a Peripheral Component Interconnect Express (PCIe) adapter that supports Converged Enhanced Ethernet (CEE). Another embodiment of the system 100 may include a multi-root I/O virtualization (MR-IOV) adapter. The network adapters 115 may further be used to implement Fiber Channel over Ethernet (FCoE) protocol, RDMA over Ethernet, Internet small computer system interface (iSCSI), and the like. In general, a network adapter 115 transfers data using an Ethernet or PCI based communication method and may be coupled to one or more of the virtual machines 111. Additionally, the adapters may facilitate shared access between the virtual machines 111. While the adapters 115 are shown as being included within the server 105, in other embodiments, the adapters may be physically distinct devices separate from the server 105.

In one embodiment, each network adapter 115 may include a converged adapter virtual bridge (not shown) that facilitates data transfer between the adapters 115 by coordinating access to the virtual machines 111. Each converged adapter virtual bridge may recognize data flowing within its domain (i.e., addressable space). A recognized domain address may be routed directly without transmitting the data outside of the domain of the particular converged adapter virtual bridge.

Each network adapter 115 may include one or more Ethernet ports that couple to one of the bridge elements 120. Additionally, to facilitate PCIe communication, the server may have a PCI Host Bridge 117. The PCI Host Bridge 117 would then connect to an upstream PCI port 122 on a switch element in the distributed switch 180. The data is then routed via the switching layer 130 to the correct downstream PCI port 123 which may be located on the same or different switch module as the upstream PCI port 122. The data may then be forwarded to the PCI device 150.

The bridge elements 120 may be configured to forward data frames throughout the distributed virtual switch 180. For example, a network adapter 115 and bridge element 120 may be connected using two 40 Gbit Ethernet connections or one 100 Gbit Ethernet connection. The bridge elements 120 forward the data frames received by the network adapter 115 to the switching layer 130. The bridge elements 120 may include a lookup table that stores address data used to forward the received data frames. For example, the bridge elements 120 may compare address data associated with a received data frame to the address data stored within the lookup table. Thus, the network adapters 115 do not need to know the network topology of the distributed switch 180.

The distributed virtual switch 180, in general, includes a plurality of bridge elements 120 that may be located on a plurality of a separate, though interconnected, hardware components. To the perspective of the network adapters 115, the switch 180 acts like one single switch even though the switch 180 may be composed of multiple switches that are physically located on different components. Distributing the switch 180 provides redundancy in case of failure.

Each of the bridge elements 120 may be connected to one or more transport layer modules 125 that translate received data frames to the protocol used by the switching layer 130. For example, the transport layer modules 125 may translate data received using either an Ethernet or PCI communication method to a generic data type (i.e., a cell or link packet) that is transmitted via the switching layer 130 (i.e., a cell fabric). Thus, the switch modules comprising the switch 180 are compatible with at least two different communication protocols—e.g., the Ethernet and PCIe communication standards. That is, at least one switch module has the necessary logic to transfer different types of data on the same switching layer 130.

Although not shown in FIG. 1, in one embodiment, the switching layer 130 may comprise a local rack interconnect with dedicated connections which connect bridge elements 120 located within the same chassis and rack, as well as links for connecting to bridge elements 120 in other chassis and racks.

After routing the cells, the switching layer 130 may communicate with transport layer modules 126 that translate the cells back to data frames that correspond to their respective communication protocols. A portion of the bridge elements 120 may facilitate communication with an Ethernet network 155 which provides access to a LAN or WAN (e.g., the Internet). Moreover, PCI data may be routed to a downstream PCI port 123 that connects to a PCIe device 150. The PCIe device 150 may be a passive backplane interconnect, as an expansion card interface for add-in boards, or common storage that can be accessed by any of the servers connected to the switch 180.

Although "upstream" and "downstream" are used to describe the PCI ports, this is only used to illustrate one possible data flow. For example, the downstream PCI port 123 may in one embodiment transmit data from the connected PCIe device 150 to the upstream PCI port 122. Thus, the PCI ports 122, 123 may both transmit as well as receive data.

A second server 106 may include a processor 109 connected to an operating system 107 and memory 110 which includes one or more virtual machines 111 similar to those found in the first server 105. The memory 110 of server 106 also includes a hypervisor 113 with a virtual bridge 114. The hypervisor 113 manages data shared between different virtual machines 111. Specifically, the virtual bridge 114 allows direct communication between connected virtual machines 111 rather than requiring the virtual machines 111 to use the bridge elements 120 or switching layer 130 to transmit data to other virtual machines 111 communicatively coupled to the hypervisor 113.

An Input/Output Management Controller (IOMC) 140 (i.e., a special-purpose processor) is coupled to at least one bridge element 120 or upstream PCI port 122 which provides the IOMC 140 with access to the switching layer 130. One function of the IOMC 140 may be to receive commands from an administrator to configure the different hardware elements of the distributed virtual switch 180. In one embodiment, these commands may be received from a separate switching network from the switching layer 130.

Although one IOMC 140 is shown, the system 100 may include a plurality of IOMCs 140. In one embodiment, these IOMCs 140 may be arranged in a hierarchy such that one IOMC 140 is chosen as a master while the others are delegated as members (or slaves).

Figure 2:
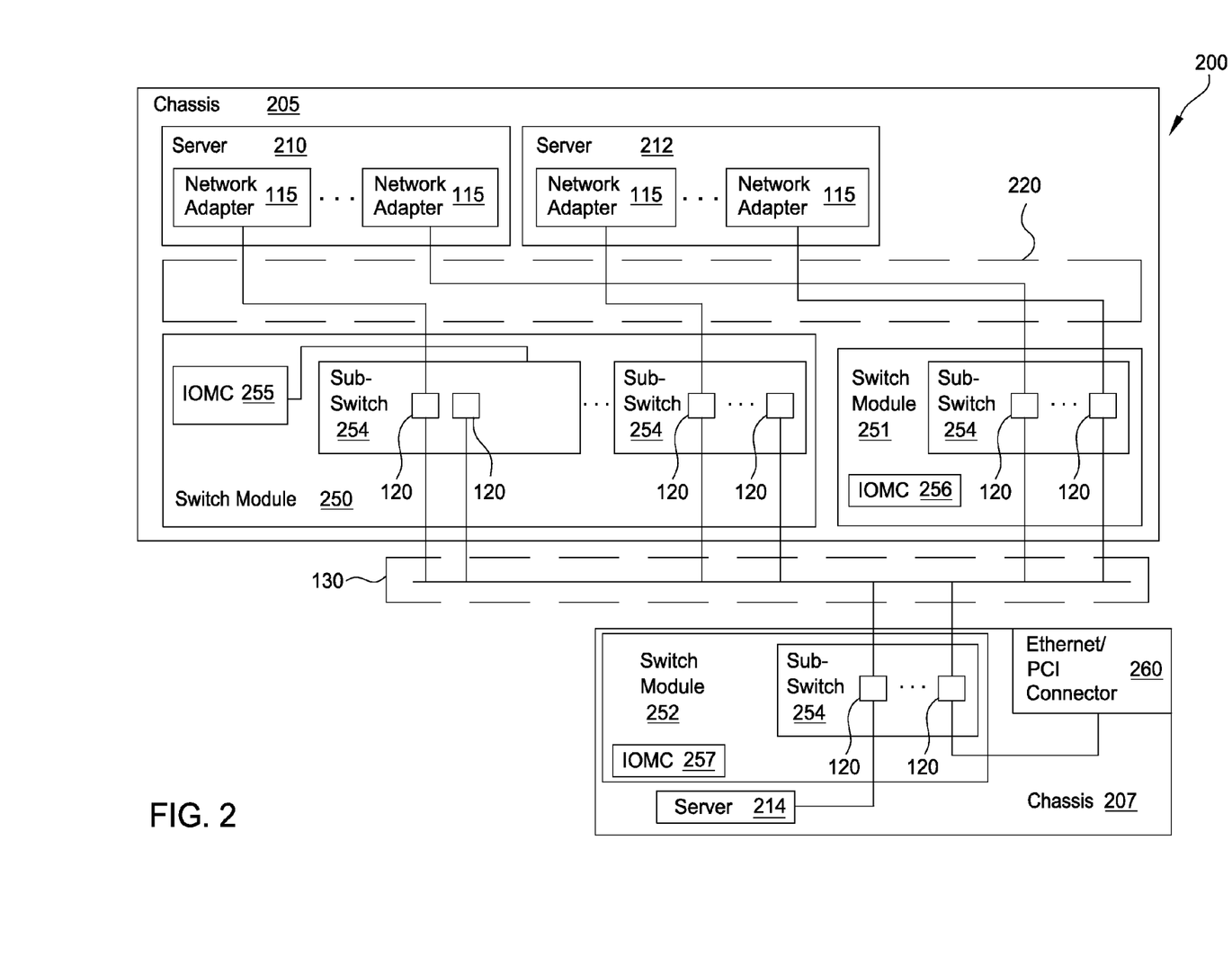
FIG. 2 illustrates the hardware representation of a system that implements a distributed, virtual switch, according to one embodiment described herein.

FIG. 2 illustrates a hardware level diagram of the system 100, according to one embodiment. Server 210 and 212 may be physically located in the same chassis 205; however, the chassis 205 may include any number of servers. The chassis 205 also includes a plurality of switch modules 250, 251 that include one or more sub-switches 254 (i.e., a microchip). In one embodiment, the switch modules 250, 251, 252 are hardware components (e.g., PCB boards, FPGA boards, etc.) that provide physical support and connectivity between the network adapters 115 and the bridge elements 120. In general, the switch modules 250, 251, 252 include hardware that connects different chassis 205, 207 and servers 210, 212, 214 in the system 200 and may be a single, replaceable part in the computing system.

The switch modules 250, 251, 252 (e.g., a chassis interconnect element) include one or more sub-switches 254 and an IOMC 255, 256, 257. The sub-switches 254 may include a logical or physical grouping of bridge elements 120—e.g., each sub-switch 254 may have five bridge elements 120. Each bridge element 120 may be physically connected to the servers 210, 212. For example, a bridge element 120 may route data sent using either Ethernet or PCI communication protocols to other bridge elements 120 attached to the switching layer 130. However, in one embodiment, the bridge element 120 may not be needed to provide connectivity from the network adapter 115 to the switching layer 130 for PCI or PCIe communications.

Each switch module 250, 251, 252 includes an IOMC 255, 256, 257 for managing and configuring the different hardware resources in the system 200. In one embodiment, the respective IOMC for each switch module 250, 251, 252 may be responsible for configuring the hardware resources on the particular switch module. However, because the switch modules are interconnected using the switching layer 130, an IOMC on one switch module may manage hardware resources on a different switch module. As discussed above, the IOMCs 255, 256, 257 are attached to at least one sub-switch 254 (or bridge element 120) in each switch module 250, 251, 252 which enables each IOMC to route commands on the switching layer 130. For clarity, these connections for IOMCs 256 and 257 have been omitted. Moreover, switch modules 251, 252 may include multiple sub-switches 254.

The dotted line in chassis 205 defines the midplane 220 between the servers 210, 212 and the switch modules 250, 251. That is, the midplane 220 includes the data paths (e.g., conductive wires or traces) that transmit data between the network adapters 115 and the sub-switches 254.

Each bridge element 120 connects to the switching layer 130 via the routing layer. In addition, a bridge element 120 may also connect to a network adapter 115 or an uplink. As used herein, an uplink port of a bridge element 120 provides a service that expands the connectivity or capabilities of the system 200. As shown in chassis 207, one bridge element 120 includes a connection to an Ethernet or PCI connector 260. For Ethernet communication, the connector 260 may provide the system 200 with access to a LAN or WAN (e.g., the Internet). Alternatively, the port connector 260 may connect the system to a PCIe expansion slot—e.g., PCIe device 150. The device 150 may be additional storage or memory which each server 210, 212, 214 may access via the switching layer 130. Advantageously, the system 200 provides access to the switching layer 130 that has network devices that are compatible with at least two different communication methods.

As shown, a server 210, 212, 214 may have a plurality of network adapters 115. This provides redundancy if one of these adapters 115 fails. Additionally, each adapter 115 may be attached via the midplane 220 to a different switch module 250, 251, 252. As illustrated, one adapter of server 210 is communicatively coupled to a bridge element 120 located in switch module 250 while the other adapter is connected to a bridge element 120 in switch module 251. If one of the switch modules 250, 251 fails, the server 210 is still able to access the switching layer 130 via the other switching module. The failed switch module may then be replaced (e.g., hot-swapped) which causes the IOMCs 255, 256, 257 and bridge elements 120 to update the routing tables and lookup tables to include the hardware elements on the new switching module.

Figure 3:
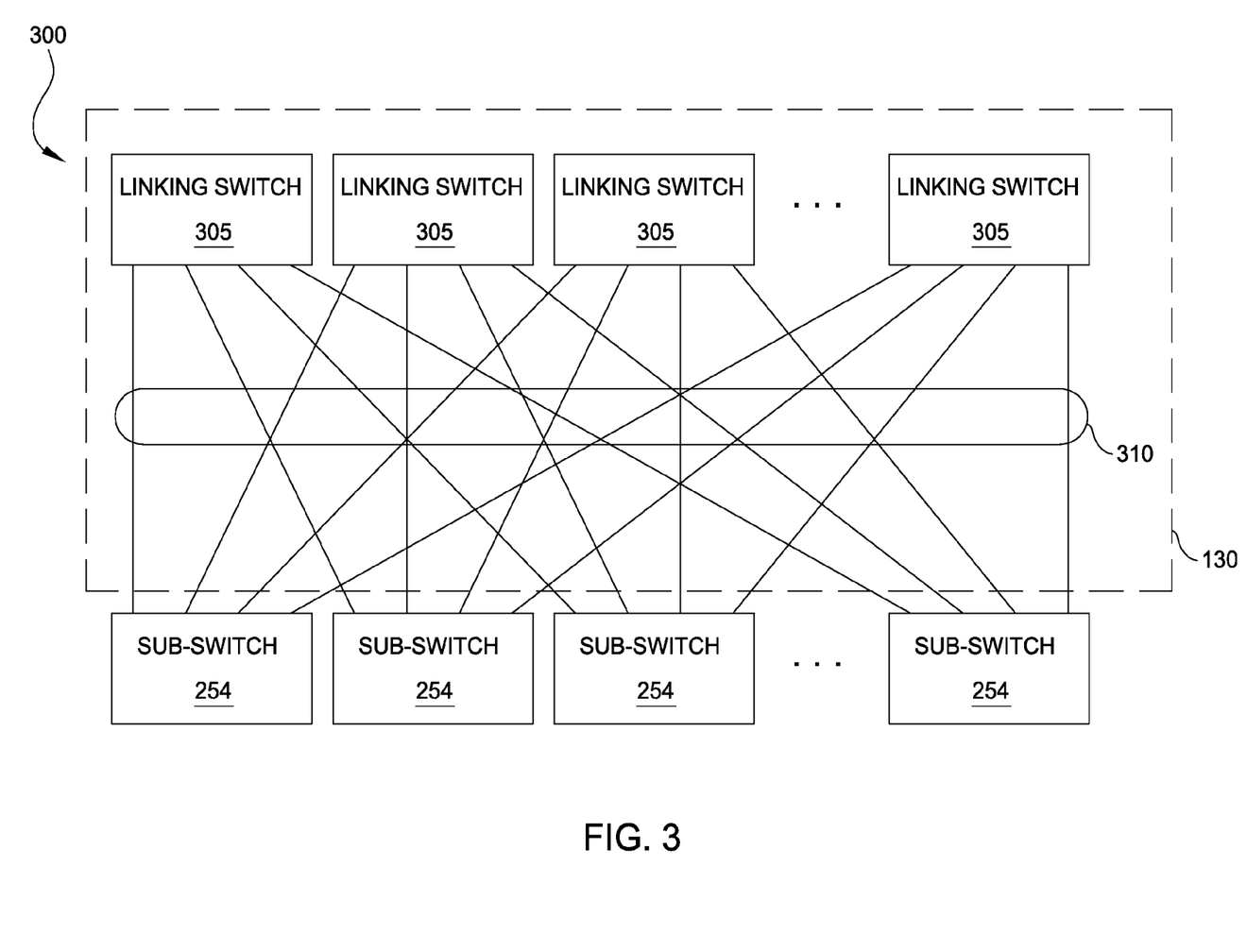
FIG. 3 illustrates a switching layer of the distributed virtual switch, according to one embodiment described herein.

FIG. 3 illustrates a switching layer of a distributed, virtual switch, according to one embodiment described herein. Each sub-switch 254 in the systems 100 and 200 are connected to each other using the switching layer 130 via a spine-leaf schema. That is, no matter the sub-switch 254 used, a cell (i.e., a link packet) can be routed to another other sub-switch 254 located on any other of the switch modules 250, 251, 252 shown in FIG. 2. This may be accomplished by directly connecting each of the sub-switches 254 to a respective one of the linking switches 305. As shown in FIG. 3, the linking switches 305 are spine nodes while the sub-switches 254 are leaf nodes. One advantage of using a spine-leaf architecture rather than, for example, a mesh network where each of the sub-switches are directly interconnected is that the sub-switches 254 can use the linking switches 305 to reach a larger number of sub-switches 254. For example, the virtual distributed switch may include 136 sub-switches 254 but only 32 linking switches 305. Thus, the sub-switches 254 need only enough ports to connect to the 32 linking switches 305 and to be able to route data to the other 135 sub-switches 254. In the mesh configuration, the sub-switches 254 would require 135 ports to reach all of the sub-switches 254. The linking switches 305 may designed with additional ports to facilitate as an intermediary between the various sub-switches 254 in the virtual switch. Although not shown, additional hierarchical layers of linking layers 305 could be added that would permit more sub-switches 254 to be added to the distributed switch without having to redesign sub-switches 254 to include additional ports.

As shown, each sub-switch 254 is connected to each of the linking switches 305 using the communication paths 310. The communication paths 310 may include one or more physical links that may use conductive metal, optical fiber, and the like for transferring the link packets between the switches 254, 305. In one embodiment, an individual communication path 310 may include two physical links: a receiving link and a transmitting link. Using the receiving link, a linking switch 305 receives link packets from the sub-switch 254 while the transmitting link is used to forward link packets whose destination is the sub-switch 254.

Figure 4:
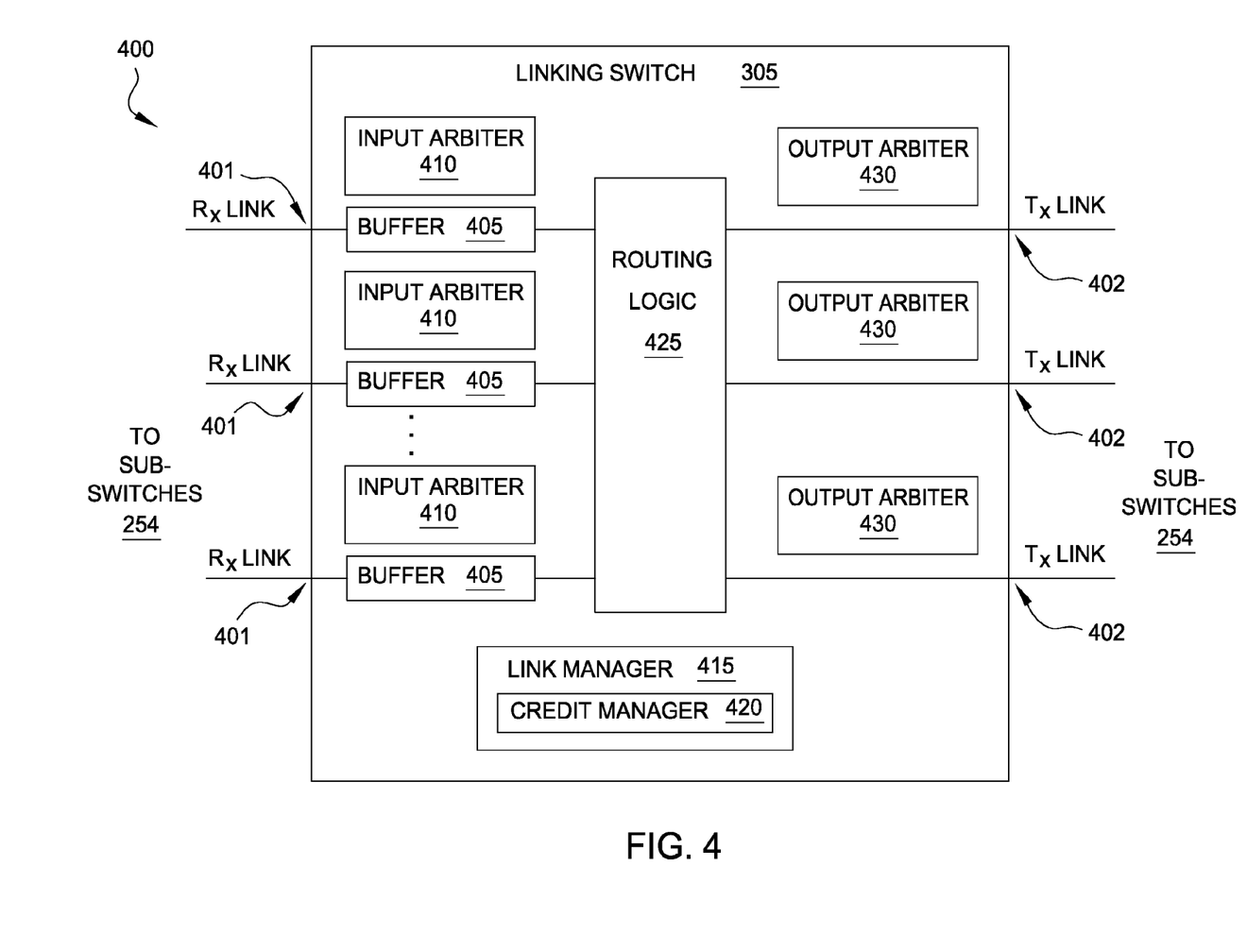
FIG. 4 illustrates a system diagram of a linking switch, according to one embodiment described herein.

FIG. 4 illustrates a system diagram of a linking switch 305, according to one embodiment described herein. As shown here, linking switch 305 includes a plurality of input ports 401 coupled to receiving links of the communication paths 310 shown in FIG. 3. Switch 305 also includes output ports 402 coupled to transmitting links of the communication paths 310. Although these ports 401, 402 are shown on opposite sides of the linking switch 305, this is for ease of illustration. In one embodiment, the ports 401 coupled to the receiving links may be adjacent to the ports 401 coupled to the transmitting links.

Linking switch 305 includes a plurality of buffers 405 corresponding to a respective input port 401. Although the buffers 405 are shown as separate memory elements, in one embodiment, the buffers 405 may be a single memory element where each input port 401 is assigned a certain portion or partition of the buffer 405. In either case, when link packets are received from the sub-switches 254, the packets are stored in the buffers 405. As described earlier, linking switch 305 serves as an intermediary between the sub-switches 254. That is, the linking switch 305 forwards packets from the transmitting sub-switch 254 to the destination sub-switch 254. However, multiple packets may have the same destination. For example, linking switch 305 may receive, in parallel, two packets on two different receiving links (i.e., from two different sub-switches 254) that have the same destination sub-switch 254. Because the linking switch 305 has only one transmitting link to each sub-switch 254, only one of the packets can be sent at a time.

To resolve this conflict, linking switch 305 includes a plurality of input and output arbiters 410, 430 which use an arbitration algorithm to determine which link packet is forwarded to the transmitting link. As will be discussed in greater detail below, the input arbiters 410 and output arbiters 430 may decide amongst themselves which packet is to be sent on the transmitting links. Their decision is forwarded to a link manger 415 which controls routing logic 425. For example, routing logic 425 may include a cross bar that permits the output of the buffers 405 to be forwarded to any one of the transmitting links. Although FIG. 4 illustrates buffering only incoming data, the embodiments described herein may also be applied to systems that buffer outgoing data or buffer both incoming and outgoing data. Moreover, the input arbiters 410 are shown separately from the output arbiters 430, however this is for ease of explanation and is not intended to imply that each arbiter must be a separate portion of the linking switch 305. For example, the input and output arbiters 410 and 430 may be different logic elements in a single arbitration module.

Using an arbitration schema to allocate shared resources, however, may result in a buffer overflow. For example, if the arbitration algorithm used by the input and output arbiters 410, 430 give priority to packets received from a high-priority sub-switch 254, packets received from low-priority sub-switches 254 that have the same destination remain stored in the buffers 405. If the low-priority sub-switches 254 continue to transmit link packets to the linking switch 305 (assuming the high-priority sub-switch 254 continues to provide packets to the same destination sub-switch), the buffers 405 may overflow and some of the link packets may be lost. To prevent buffer overflow, link manager 415 includes a credit manager 420 for controlling the amount of link packets that are transmitting to linking switch 305. The link manager 415 may include logic (firmware or hardware) for routing the link packets through the linking switch 305. Specifically, the link manager 415 may be informed by the arbiters 410 and 430 which link packet should be sent on which transmitting link. For example, link manager 415 may control routing logic 425 to ensure that the selected link packet is routed to the transmitting link corresponding to its destination sub-switch 254.

The credit manager 420 may be tasked with managing credits provided to the sub-switches 254 coupled to linking switch 305. Each sub-switch 254 may be designed to manage a maximum number of credits—e.g., a maximum of eight credits. Upon start-up, the credit manager 420 may provide each sub-switch 254 with the maximum number of credits. As the sub-switch 254 transmits a link packet to linking switch 305, the sub-switch 254 decrements the total number of credits. In parallel, the credit manager 420 monitors buffers 405 to determine when one of the stored link packets is selected by the arbitration algorithm to be transmitted on one of the transmitting links. Once a link packet is transmitted, credit manager 420 returns a credit to the corresponding sub-switch 254. Because each sub-switch 254 is allocated a buffer 245 (or a portion of a buffer), the number of credits allocated to the sub-switch 254 may correspond to the number of available memory locations for storing the link packets. That is, if buffers 405 have eight total memory locations, then each sub-switch 254 is allocated eight credits. As the link packets are forwarded—i.e., as a stored link packet leaves the buffer 405—the credit manager 420 returns a credit to the corresponding sub-switch 254.

Figure 5:
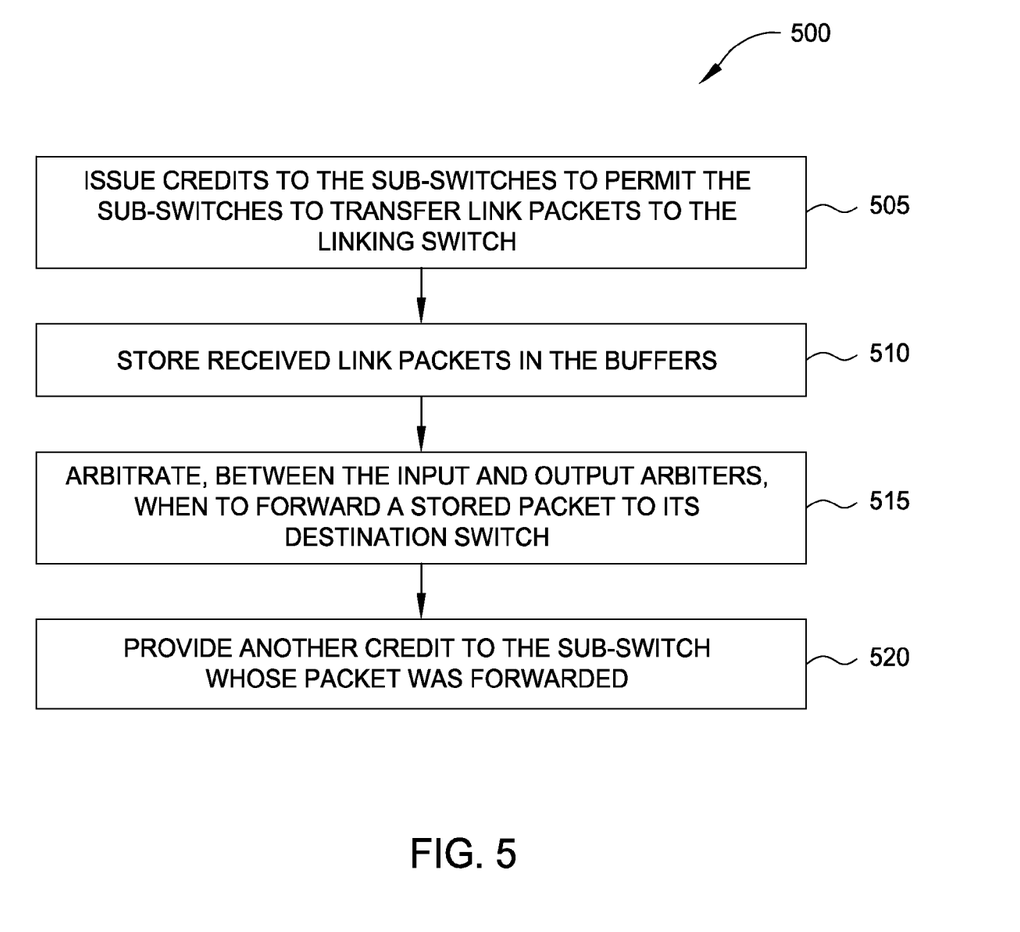
FIG. 5 illustrates a method for providing credits for transmitting link packets, according to one embodiment described herein.

FIG. 5 illustrates a method 500 for providing credits for transmitting link packets, according to one embodiment described herein. At block 505, the credit manager may issue credits to the sub-switches indicating the number of link packets the sub-switches may transmit to the linking switch. That is, the sub-switch includes logic for managing its credits. Each time the sub-switch transmits a link packet to the linking switch, the logic reduces by one the number of allocated credits. However, as the linking switch forwards to the received link packets to the destination sub-switches, the credit manager returns a credit to the corresponding sub-switch.

At block 510, the linking switch stores the received packets in a buffer (or a portion of a buffer) associated with a particular sub-switch. Because the buffer has a finite number of memory locations, the credits ensure that the sub-switch cannot send more link packets than the buffer can store. For example, once the sub-switch spends all of its allocated credits, the sub-switch does not send additional link packets until the credit manager returns credits. As mentioned previously, the credit manager sends additional credits once the arbitration algorithm selects one of the link packets in the buffer for forwarding to its destination.

At block 515, the input and output arbiters perform the arbitration algorithm in order to select which buffered link packets are transmitted on which transmitting links during each transmit period. For example, multiple buffered packets may have the same destination sub-switch, and thus, may be competing to use the same transmitting link. The embodiments described herein, however, are not dependent upon any one particular arbitration algorithm. As non-limiting example, the input and output arbiters 410, 430 shown in FIG. 4 may use a request-grant-accept arbitration algorithm for determining which packets are transmitting during each transmit period.

During the request phase, each input arbiter determines how many link packets are in its corresponding buffer and the destination of these packets. In one embodiment, the input arbiter may form a bit vector indicating which transmitting links the buffered packets need to use to reach their destinations. Each input arbiter may send its bit vector to all the other input arbiters on the linking switch. In this manner, the input arbiters inform each other which transmitting links the arbiters are requesting to use.

During the grant phase, the output arbiter receives the bit vectors and determines which input arbiter is given access to the transmitting link. For example, if two input arbiters both have link packets attempting to the use same transmitting link, the output arbiter may use a fairness algorithm, priority information, historical data, and the like to determine which of the two input arbiters is granted access to the transmitting link. Once decided, the output arbiter instructs the winning input arbiter that it has been selected. In some embodiments, the output arbiter may also instruct the losing input arbiter that its request was denied.

After the grant phase, an input arbiter may receive multiple grants. However, the buffer may be able to output only one of the link packets during a single transmit period. Accordingly, during the accept phase, the input arbiter may select which grant to accept. The input arbiter may use a fairness algorithm, the time a link packet has been stored in the buffer, packet priority, and the like to determine which grant to accept. For example, the input arbiter may select between the grants depending on which of the associated link packets have been stored the longest in the buffer. Once the arbitration is finished, the input arbiters inform the link manager the destination of the packet that was selected. In turn, the link manager configures the routing logic to transport the selected link packet from the buffer to the transmitting link corresponding to the destination.

At block 520, the credit manager determines which buffers outputted link packets to the routing logic. For these buffers, the credit manager returns a credit to the sub-switches assigned to the buffers. Stated differently, because the buffers now have at least one free memory location to store a link packet, the credit manager informs the sub-switch connected to the buffer that the sub-switch can transmit another link packet if ready. In this manner, the linking switch uses the arbitration algorithm and credit schema to control link packets flowing into and out of the buffers.

Figure 6:
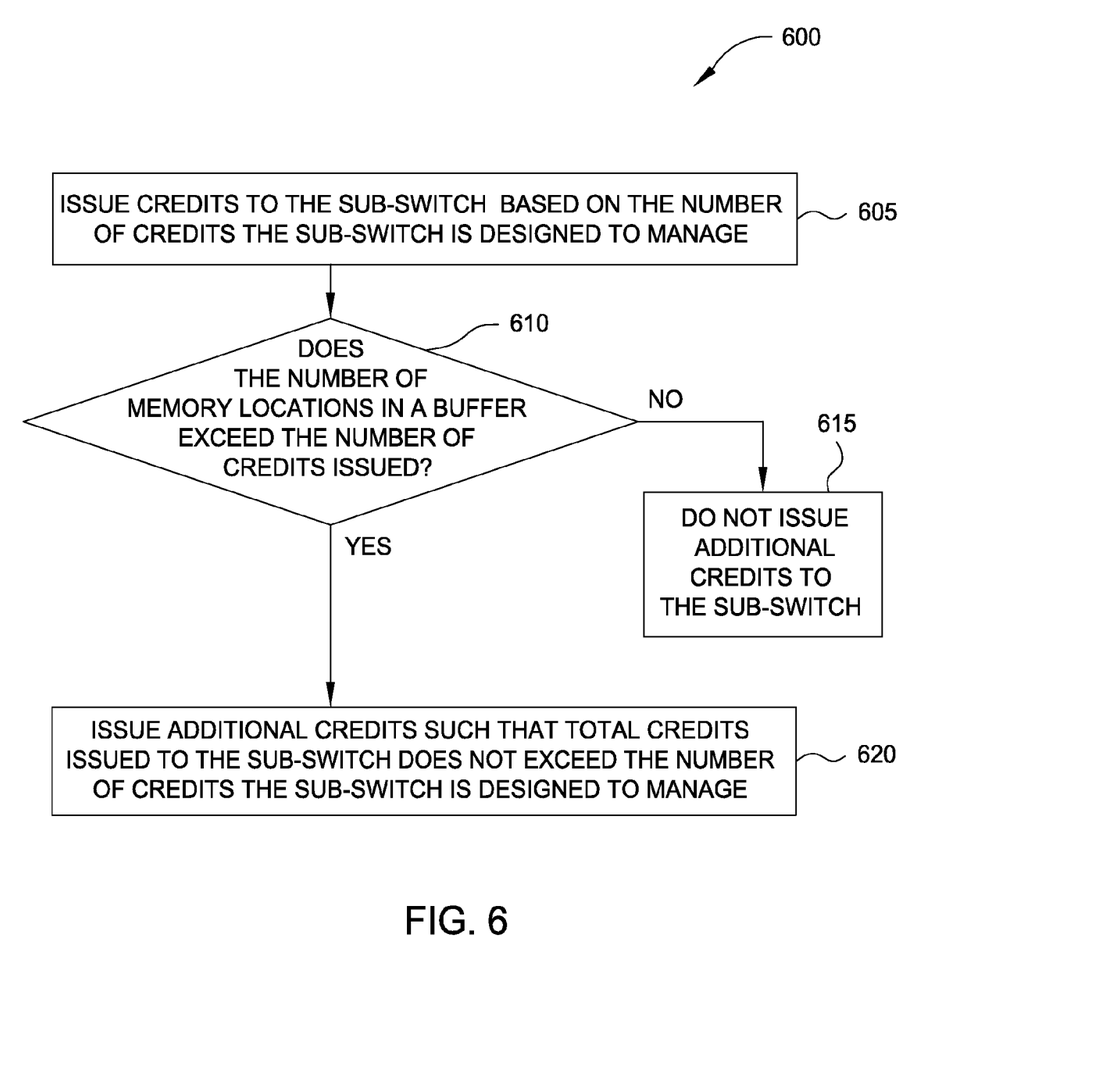
FIG. 6 illustrates a method for issuing additional credits to a switch based on available memory locations, according to one embodiment described herein.

FIG. 6 illustrates a method 600 for issuing additional credits to a switch based on available memory locations, according to one embodiment described herein. At block 605, the credit manager issues credits to the sub-switch based on the number of credits the sub-switch is designed to manage. For example, at start-up of the virtual distributed switch, the credit manager may allocate the total number of credits that the sub-switch is capable of managing. As link packets are transmitted to the linking switch, the sub-switch tracks the remaining credits. As shown by method 500 of FIG. 5, once the linking switch forwards a link packet to a destination sub-switch using the arbitration algorithm, the credit manager returns a credit to the originating sub-switch.

In addition to returning credits when a link packet is forwarded to a destination sub-switch, the credit manager may provide additional credits to a sub-switch. At block 610, the credit manager determines whether the number of memory locations in the buffer exceeds the number of issued credits—i.e., the maximum number of credits the sub-switch is designed to manage. For example, a sub-switch may be designed by an engineer to manage a maximum of eight credits. During testing, the engineer may verify that the sub-switch operates properly when managing the maximum number credits (e.g., eight credits). Accordingly, the engineer knows that when the credit manager provides eight credits to the sub-switch, the sub-switch will behave normally. The buffers on the linking switch, however, may be designed with more than eight memory locations. Thus, if the sub-switch has only eight credits, at any given time, the sub-switch can send at most eight link packets to the linking switch for storage. However, the buffer may include, for example, twelve memory locations for storing the link packet, and thus, up to four memory locations may be unused. Enabling the sub-switch to store link packets in all twelve of the memory locations may more efficiently use the hardware resources and improve system throughput relative to not allowing the sub-switch to use the full capacity of the buffer.

If the number of memory locations of the buffer (i.e., the capacity of the buffer) does not exceed the total number of credits the sub-switch is designed to manage, at block 615, the credit manager does not allocate additional credits to the sub-switch. However, if the reverse is true (e.g., the sub-switch is designed to manage a maximum of eight credits but the buffers can hold twelve link packets), then at block 620 the credit manager issues additional credits to the sub-switch.

In one embodiment, the credit manager may issue the additional credits at start-up. For example, instead of providing the sub-switch with eight credits, the credit manager provides twelve credits corresponding to the four extra memory locations in the buffer. However, as described previously, the sub-switch may have been designed and tested based on managing a maximum of eight credits. Thus, allocating credits beyond the credit maximum of the sub-switch may result in undesired action. For example, providing the sub-switch with twelve credits may reveal an unknown error, exceeds the capabilities of the hardware of the sub-switch, or cause the firmware to fail. Accordingly, allowing the number of credits currently allocated to the sub-switch to exceed the maximum credit limit may cause the virtual switch to behave unpredictably. Thus, as the buffers of the linking switch increase, the credit manager may be backwards compatible with versions of the sub-switch designed to manage less credits than there are memory locations.

To efficiently use the memory locations of the buffer but not exceed the parameters for which the sub-switch is verified, at block 620 the credit manager may provide the additional credits in a way such that the sub-switch is not allocated a greater number of credits that its logic is designed to manage. For example, the credit manager may provide an additional credit to the sub-switch whenever its current credit count is below the maximum credit limit. In one embodiment, the credit manager may initialize the sub-switch with eight credits (i.e., the maximum credit limit). Once the sub-switch transmits a link packet to the linking switch, the credit manager may provide an extra credit to the sub-switch—i.e., the sub-switch again has eight credits. Once the sub-switch transmits another link packet, the credit manager again provides an extra credit. This process continues until the credit manager has allocated enough extra credits to fill the additional memory locations in the buffer. For example, assuming the linking switch does not forward any of the received packets, the buffer may store twelve link packets transmitted by the sub-switch even though the sub-switch never was allocated more than eight credits at any one time.

In another embodiment, the credit manager may wait until the sub-switch has spent all its credits before providing the extra credits. Using the example provided above, assume the sub-switch has sent eight link packets that are stored in the buffer. Because the credit manager determines that the buffer has four additional memory locations, the manager may transmit another four credits to the sub-switch. Of course, if in the meantime the linking switch forwards one of the stored link packets, the credit manager may also refund this credit as well as the four additional credits to the sub-switch. A non-limiting example of this embodiment is shown in FIG. 7.

Figure 7:
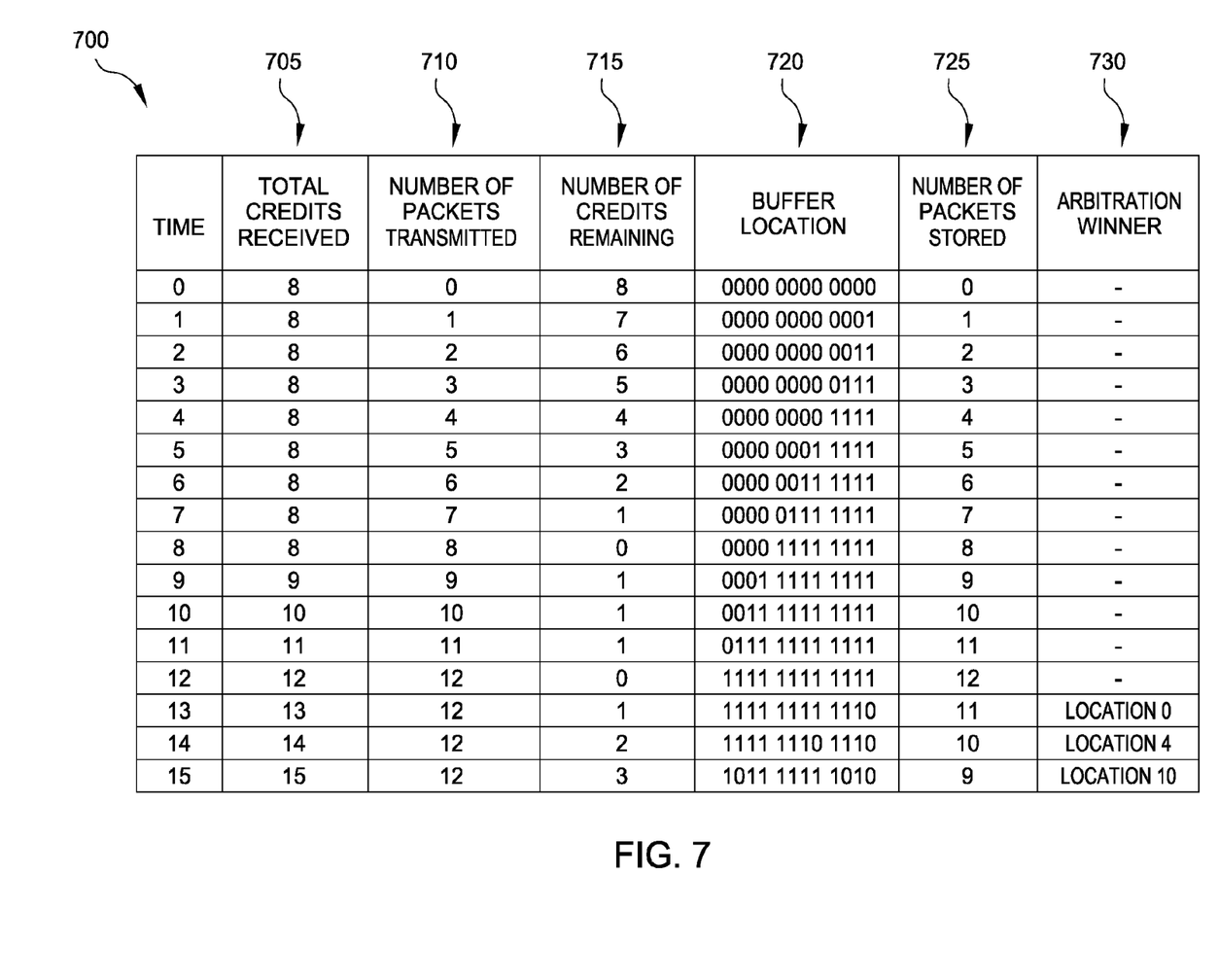
FIG. 7 illustrates a chart for managing credits in a distributed switch, according to one embodiment described herein.

FIG. 7 illustrates a chart 700 for managing credits in a distributed switch, according to one embodiment described herein. For the example shown, the sub-switch is designed to manage a maximum credit limit of eight credits while the corresponding buffer include twelve memory locations that can each store one link packet. Column 705 illustrates the total credits transmitted from the credit manager to the sub-switch. The value in column 705 includes refunded credits as well as extra credits sent to the sub-switch because the buffer has additional memory locations. Column 710 illustrates the number of packets that the sub-switch has transmitted to the linking switch via the receiving link. Column 715 illustrates the number of credits remaining, i.e., the current number of credits allocated to the sub-switch. Column 720 illustrates bit vectors that show occupied memory locations in the buffer of the linking switch. The twelve bit positions of the bit vector each correspond to a memory location of the buffer—e.g., positions 0 through 11. Column 725 illustrates the number of packets currently stored in the buffer. Note that the value in column 725 may also be found by summing the number of ones in the bit vector shown in column 720. Column 730 illustrates the memory location of the buffer that won arbitration. That is, column 730 provides the memory location of the packet that is forward to its destination during that time period. If a row in column 730 does not include a memory location, it is assumed none of the link packets stored in the buffer won the arbitration. Instead, link packets stored on other buffers in the linking switch were transmitted on the desired transmitting links during that particular time period.

At time 0, the credit manager transmits the maximum credit limit of eight credits to the sub-switch. The credit manager may provide these credits at once or over multiple time periods. Here, it is assumed that at time 0 the virtual distributed switch is at start-up (or soon thereafter) where the sub-switch has yet to transmit link packets to the linking switch. Accordingly, the credit count of the sub-switch includes all eight of the credits sent by the linking switch and the buffer on the linking switch is empty.

At time 1, the sub-switch transmits a link packet to the linking switch as shown by column 710. Doing so leaves the sub-switch with only seven remaining credits (column 715). The buffer may store the received link packet in any available memory locations. For ease of explanation, chart 700 assumes the received packets are stored in ascending order—i.e., position 0 to position 11. Thus, the bit corresponding to position 0 of the bit vector in column 720 is changed to a one to indicate that this memory location is occupied.

At time 2, the sub-switch transmits a second link packet to the linking switch which increments the total number of packets transmitted to the linking switch and decrements the current credit count maintained by the sub-switch. The buffer now stores two of the link packets in position 0 and 1, respectively. This process continues until time 8 when the sub-switch has spent all of its credits and eight of the twelve memory locations in the buffer are occupied. Without additional credits, the sub-switch is not permitted to transmit additional link packets to the linking switch; however, as shown by column 720, the buffer has another four memory locations available.

The credit manager may determine that the sub-switch has expended all its credits but the buffer still has additional memory locations. Accordingly, the credit manager may provide extra credits to the sub-switch. At time 9, the credit manager alerts the sub-switch that it has another credit which the sub-switch immediately uses to transmit another link packet to the linking switch—e.g., the buffer now stores nine packets received from the sub-switch. During times 10-12, the credit manager sends another three credits to the sub-switch which responds by using the credits to send another three packets. At time 12, the buffer assigned to the sub-switch is full and all the credits have been expended.

In this manner, twelve total credits were issued, but the sub-switch at most managed eight credits. In chart 700, the credit manager waits until the sub-switch has transmitted all the credits before issuing additional credits. To do so, the credit manager may maintain an internal count of the number of credits remaining for the sub-switch as shown in column 715. For example, if the buffer had an additional ten empty locations at time 8, the credit manager may use the internal count to ensure that it does not provide all ten credits to the sub-switch without the sub-switch using the extra credits to transfer link packets. In this scenario, the credit manager may send eight of the ten extra credits but wait to send the other two credits until the sub-switch forwards two more link packets to the linking switch.

Assume at time 13 the link packet stored at location 0 in the buffer won arbitration. In response, the buffer outputs the link packet which is transmitted to its destination sub-switch, thereby freeing the corresponding memory location in the buffer (as shown by the zero bit at location 0). Because one of the link packets is removed from the buffer, the credit manager returns a credit to the sub-switch. During times 14 and 15, additional link packets stored in the buffer have won arbitration and are forwarded on the transmitting links, thereby allowing the credit manager to refund two credits to the sub-switch. Nonetheless, the credit manager may continually monitor the number of credits the sub-switch has remaining to ensure this value does not exceed the maximum limit of credits the sub-switch is verified or designed to manage. Thus, even if more than eight memory locations are freed, the credit manager may permit the sub-switch to have only a maximum of eight credits at any given time.

Although chart 700 illustrates filling the buffer before any link packets win arbitration, this is for ease of explanation. In many applications, the previously stored packets may win arbitration and be expelled from the buffer (and a credit returned to the sub-switch) before the buffer reaches its maximum capacity. Moreover, chart 700 illustrates one of many techniques for managing credits allocated to the sub-switch. For example, in another embodiment, the credit manager may allocate the extra credits as soon as the sub-switch begins transmitting packets. Namely, at time 1, once the link packet is received, in response the credit manager may provide an extra credit to the sub-switch. Thus, even after transmitting four link packets, the sub-switch would still have eight credits remaining in column 715. One of ordinary skill in the art will recognize the different techniques that a credit manager may allocate credits to efficiently use a buffer yet ensure the maximum credit limit of the sub-switch is not exceeded.

CONCLUSION

To ensure that data portions sent by a transmitting entity to a receiving entity do not overflow the buffer capacity of the receiving entity, the receiving entity may use credits to control the total amount of packets any single transmitting entity can forward. Once the assigned credits are spent, the transmitting entity cannot send data portions to the receiving entity until the receiving entity allocates additional credits to the transmitting entity. However, the logic in the receiving entity may be designed to manage a maximum total number of credits but the buffer capacity of the transmitting entity may be able to store additional data portions—e.g., the receiving entity is designed to manage a maximum of eight credits but the buffer has room for twelve data portions. To use the buffers efficiently, the transmitting entity may identify when extra buffer storage is available and provide additional credits to the receiving entity. Nonetheless, the transmitting entity may control when the credits are provided such that the receiving entity does not have more credits that it was designed to manage. In this manner, a transmitting entity with extra buffer space may be efficiently used with a receiving entity designed to manage less credits than the total buffer space.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product comprising:
a computer-readable storage device having computer-readable program code embodied therewith, the computer-readable program code comprising computer-readable program code configured to:
provide a number of credits to a first module not in excess of a maximum number of credits the first module is designed to manage, wherein the first module maintains a credit count that is decreased each time a data packet is transmitted from the first module to a second module;
store a plurality of received data packets from the first module in a memory buffer in the second module, the memory buffer having predefined memory locations dedicated to storing data packets received only from the first module, wherein the number of memory locations exceeds the maximum number of credits the first module is designed to manage;
determine a total number of extra credits allowed to the first module by subtracting the maximum number of credits from the number of memory locations; and
upon determining that the credit count of the first module is less than the maximum number of credits and that there is available space in the memory locations, provide an extra credit to the first module from the total number of extra credits to thereby increase the credit count without exceeding the maximum number of credits that the first module is designed to manage.

2. The computer program product of claim 1, further comprising computer-readable program code configured to:
perform arbitration to determine if one of the received data packets stored in the memory buffer is to be forward on an output link of the second module;
if so:
forward the one received data packet on the output link, and
provide a refund credit to the first module, thereby increasing the credit count.

3. The computer program product of claim 1, further comprising computer-readable program code configured to, upon start up of the second module, set the credit count equal to the maximum number of credits the first module is designed to manage.

4. The computer program product of claim 1, further comprising computer-readable program code configured to:
provide the total number of extra credits to the first module after determining that the credit count is zero.

5. The computer program product of claim 1, wherein the first module comprises a first switch and the second module comprises a second switch, wherein the first module is mounted on a first board and the second module is mounted on a second board physically separate from the first board.

6. The computer program product of claim 5, wherein the first switch is coupled to the second switch by a transmit link and a receive link.

7. A system, comprising:
a first module designed to manage no more than a maximum number of credits, the first module is configured to maintain a credit count that decreases each time a data packet is transmitted by the first module;
a second module comprising a memory buffer; and
an interconnect coupling the first module to the memory buffer in the second module,
wherein the second module is configured to:
provide the maximum number of credits to the first module;

store a plurality of data packets received from the first module in the memory buffer, the memory buffer having predefined memory locations dedicated to storing data packets received only from the first module, wherein the number of memory locations exceeds the maximum number of credits the first module is designed to manage;

determine a total number of extra credits allowed to the first module by subtracting the maximum number of credits from the number of memory locations; and upon determining that the credit count of the first module is less than the maximum number of credits and that there is available space in the memory locations, provide an extra credit to the first module from the total number of extra credits to thereby increase the credit count without exceeding the maximum number of credits that the first module is designed to manage.

8. The system of claim 7, wherein the second module is configured to:

perform arbitration to determine if one of the received data packets stored in the memory buffer is to be forward on an output link of the second module;

if so:
forward the one received data packet on the output link, and provide a refund credit to the first module, thereby increasing the credit count.

9. The system of claim 7, wherein the second module is configured to, upon start up, set the credit count equal to the maximum number of credits the first module is designed to manage.

10. The system of claim 7, wherein the first module comprises a first switch and the second module comprises a second switch, wherein the first module is mounted on a first board and the second module is mounted on a second board physically separate from the first board.

11. The system of claim 10, wherein the first switch is coupled to the second switch by a transmit link and a receive link.

* * * * *